(12) United States Patent
Chen

(10) Patent No.: US 12,032,860 B2
(45) Date of Patent: Jul. 9, 2024

(54) DATA PROTECTION METHOD FOR MEMORY AND STORAGE DEVICE THEREOF

(71) Applicant: YANGTZE MEMORY TECHNOLOGIES CO., LTD., Wuhan (CN)

(72) Inventor: Yonggang Chen, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 51 days.

(21) Appl. No.: 17/725,992

(22) Filed: Apr. 21, 2022

(65) Prior Publication Data

US 2023/0103004 A1 Mar. 30, 2023

Related U.S. Application Data

(63) Continuation of application No. PCT/CN2021/121705, filed on Sep. 29, 2021.

(51) Int. Cl.
*G06F 3/06* (2006.01)

(52) U.S. Cl.
CPC ............ *G06F 3/0689* (2013.01); *G06F 3/062* (2013.01); *G06F 3/064* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 4,782,488 A * 11/1988 Anderson ............... G11C 29/56
713/190
4,924,330 A * 5/1990 Seamons ........... G11B 11/10595
(Continued)

FOREIGN PATENT DOCUMENTS

CN 103268266 A 8/2013
CN 108108148 A 6/2018

OTHER PUBLICATIONS

MicroHash: An Efficient Index Structure for Flash-Based Sensor Devices; Zeinlalipour-Yazti et al.; FAST '05: 4th USENIX Conference on File and Storage Technologies; 2005; retrieved from https://www.usenix.org/legacy/events/fast05/tech/full_papers/zeinalipour-yazti/zeinalipour-yazti.pdf on Nov. 13, 2023 (Year: 2005).*

(Continued)

*Primary Examiner* — Daniel C. Chappell
(74) *Attorney, Agent, or Firm* — BAYES PLLC

(57) ABSTRACT

The present disclosure provides a system. The system includes a memory device configured to store memory data. The memory device includes a plurality of valid memory blocks that comprises a first valid memory block and a second valid memory block. The system also includes a controller, having a processor and a memory, operatively coupled to the first and second valid memory blocks. The controller is configured to, in an operation on redundant array of independent disks (RAID), generate an address chain in a check code factor of the plurality of valid memory blocks, the address chain comprising a first address point pointing to the first valid memory block. The controller is also configured to generate, in the first valid memory block, a second address pointer, the second address pointer pointing to the second valid memory block.

18 Claims, 5 Drawing Sheets

(58) Field of Classification Search
CPC .............. G06F 3/00; G06F 3/06–0689; G06F
5/00–16; G06F 8/00–78; G06F 9/00–548;
G06F 11/00–3696; G06F 12/00–16; G06F
13/00–4295; G06F 15/00–825; G06F
16/00–986; G06F 18/00–41; G06F
17/00–40; G06F 21/00–88; G06F
2003/0697; G06F 2009/3883; G06F
2009/45562–45595; G06F 2015/761–768;
G06F 2201/00–885; G06F 2206/00–20;
G06F 2209/00–549; G06F 2211/00–902;
G06F 2212/00–7211; G06F
2213/00–4004; G06F 2216/00–17; G06F
2221/00–2153; G06N 3/00–126; G06N
5/00–048; G06N 7/00–08; G06N 10/00;
G06N 20/00–20; G06N 99/00–007; G06T
1/00–60; G06V 30/00–43; G11B
20/00–24; G11B 33/00–1493; G11C
11/00–5692; G11C 13/00–06; G11C
14/00–009; G11C 15/00–06; G11C
16/00–3495; G11C 17/00–18; G11C
2207/00–229; G11C 2216/00–30; H01L
25/00–50; H01L 2225/00–1094; H03M
7/00–707; H04L 9/00–38; H04L
12/00–66; H04L 41/00–5096; H04L
49/00–9094; H04L 61/00–59; H04L
67/00–75
See application file for complete search history.

(56) References Cited

U.S. PATENT DOCUMENTS

| | | | | |
|---|---|---|---|---|
| 5,610,808 | A * | 3/1997 | Squires | G11B 5/5578 360/78.12 |
| 6,247,099 | B1 * | 6/2001 | Skazinski | G06F 12/0866 711/E12.019 |
| 6,269,464 | B1 * | 7/2001 | Boussina | H03M 13/091 714/752 |
| 6,282,365 | B1 * | 8/2001 | Gotoh | G11B 20/1866 |
| 6,321,358 | B1 * | 11/2001 | Anderson | G11B 5/64 714/763 |
| 6,950,976 | B1 * | 9/2005 | Garrabrant | H03M 13/39 714/794 |
| 7,496,462 | B2 * | 2/2009 | Murokita | G01D 5/2449 714/776 |
| 8,271,672 | B1 * | 9/2012 | Zhang | H04L 47/522 709/233 |
| 11,573,723 | B2 * | 2/2023 | Nehse | G06F 3/0632 |
| 11,907,059 | B2 * | 2/2024 | Tan | G06F 3/0679 |
| 2002/0087956 | A1 * | 7/2002 | Darlet | G06F 9/44521 717/159 |
| 2004/0065744 | A1 * | 4/2004 | Shiraishi | G06F 12/0246 235/492 |
| 2004/0143832 | A1 * | 7/2004 | Yamamoto | G06F 3/0631 717/174 |
| 2005/0144516 | A1 * | 6/2005 | Gonzalez | G06F 12/0246 714/6.13 |
| 2007/0143532 | A1 * | 6/2007 | Gorobets | G06F 3/0679 711/103 |
| 2007/0143741 | A1 * | 6/2007 | Harris | G06F 9/30181 717/121 |
| 2007/0169030 | A1 * | 7/2007 | Tarditi | G06F 9/466 717/140 |
| 2011/0228795 | A1 * | 9/2011 | Agrawal | H04L 47/522 370/417 |
| 2012/0099593 | A1 * | 4/2012 | Luby | H04L 1/1621 370/392 |
| 2012/0254574 | A1 * | 10/2012 | Sinclair | G11C 11/5628 711/E12.002 |
| 2014/0022660 | A1 * | 1/2014 | Grobis | G11B 20/10009 |
| 2016/0110687 | A1 * | 4/2016 | Kamat | G06Q 10/101 705/301 |
| 2017/0003896 | A1 * | 1/2017 | Seppanen | G06F 3/0658 |
| 2018/0074891 | A1 * | 3/2018 | Yang | G11C 29/52 |
| 2019/0303622 | A1 * | 10/2019 | Versteeg | H04L 9/50 |
| 2020/0057578 | A1 | 2/2020 | Benisty et al. | |
| 2020/0210290 | A1 * | 7/2020 | Chang | G06F 11/1092 |

OTHER PUBLICATIONS

Drive Research diary-linked list + backup linked list; Dec. 6, 2018; retrieved from https://topic.alibabacloud.com/a/drive-research-diary-linked-list--backup-linked-list_8_8_32150587.html on Jan. 10, 2024 (Year: 2018).*

Z. Li, Y. Xu, Y. Li, C. Tian and J. C. S. Lui, "A Fast Approach to Scale Up Disk Arrays With Parity Declustered Data Layout by Minimizing Data Migration," in IEEE Access, vol. 7, pp. 23967-23989, 2019, doi: 10.1109/ACCESS.2019.2896263. (Year: 2019).*

W. Yi, Z. Sun, H. Xu, J. Diao, N. Li and M. Wang, "Dual RAID: A scheme for high reliable all flash array," 2014 11th International Joint Conference on Computer Science and Software Engineering (JCSSE), Chon Buri, Thailand, 2014, pp. 218-222, doi: 10.1109/JCSSE.2014.6841870. (Year: 2014).*

Z. Li, Y. Xu, Y. Li, C. Tian and Y. Bai, "PDS: An I/O-Efficient Scaling Scheme for Parity Declustered Data Layout," 2017 46th International Conference on Parallel Processing (ICPP), Bristol, UK, 2017, pp. 402-411, doi: 10.1109/ICPP.2017.49. (Year: 2017).*

International Search Report issued in corresponding International Application No. PCT/CN2021/121705, dated Jun. 29, 2022, 5 pages.

* cited by examiner

300

S310: generating check code data of a check factor based on data stored in a plurality of valid memory blocks of the plurality of memory blocks S320: configuring a first plurality of address pointers for the plurality of memory blocks in the check factor S330: setting a second plurality of address pointers in each of the valid memory blocks, wherein each of the second plurality of address pointers in each of the valid memory blocks points to a respective one of other valid memory blocks, respectively, and the first plurality of address pointers and the second plurality of address pointers of the plurality of valid memory blocks can form together an address chain covering all valid memory blocks of the plurality of valid memory blocks

FIG.3

DATA PROTECTION METHOD FOR MEMORY AND STORAGE DEVICE THEREOF

CROSS-REFERENCE TO RELATED APPLICATIONS

This application is a continuation of International Application No. PCT/CN2021/121705, filed on Sep. 29, 2021, which is hereby incorporated by reference in its entirety.

BACKGROUND

The present disclosure generally relates to the field of data storage, particularly to a method that can restore data lost in one memory block of a memory based on RAID and a storage device thereof.

RAID (Redundant Array of Independent Disks) is a disk array formed by combining a plurality of independent disks in various manners. RAID can provide error correction by data verification/mirror function, thereby enhancing security of data storage. Therefore, RAID has been widely applied in fields of data storage and data protection.

In recent years, in order to further improve the bit density of flash memories and reduce their costs, three-dimensional (3D) NAND flash memory devices have been developed. However, in the programming process of one memory block of a 3D NAND flash memory, all data to be written cannot be written into the one memory block successfully due to various reasons such as power down, writing failure. In this case, the writing of the one memory block is not completed, and thus partial data written into the one memory block will not be available. When the writing of the 3D NAND flash memory starts again, the one memory block will be skipped and writing will be started from the adjacent memory block. In order to restore lost data in a "successfully written" memory block with RAID after the writing is completed, unavailable data in those "unsuccessfully written" memory blocks will be skipped when a check code data is calculated based on data stored in a plurality of "successfully written" memory blocks, and unavailable data in those "unsuccessfully written" memory blocks will be skipped again when data lost later in the "successfully written" memory block is restored with the check code data. Therefore, an additional data for recording which data has been skipped needs to be generated when the check code data is calculated, wherein the check code data and the additional data together form a check factor for restoring data lost later in a "successfully written" memory block.

Accordingly, a data protection method for a memory and a storage device thereof that can significantly reduce space demand for the additional data of the check factor, maintain the ECC error correction capability of the system and significantly reduce space waste of the memory are desired.

SUMMARY

According to an embodiment of the present disclosure, there is provided a data protection method for a memory, the memory comprising a plurality of memory blocks, the method comprising: generating check code data of a check factor based on data stored in a plurality of valid memory blocks of the plurality of memory blocks; configuring a first plurality of address pointers for the plurality of memory blocks in the check factor; and setting a second plurality of address pointers in each of the valid memory blocks, wherein each of the second plurality of address pointers in each of the valid memory blocks points to a respective one of other valid memory blocks, respectively, and the first plurality of address pointers and the second plurality of address pointers of the plurality of valid memory blocks can form together an address chain covering all valid memory blocks of the plurality of valid memory blocks.

In some embodiments, the first plurality of address pointers are two address pointers, the second plurality of address pointers are two address pointers, and in case that data stored in one valid memory block of the plurality of valid memory blocks has been lost and the second plurality of address pointers configured for the one valid memory block have been lost, the first plurality of address pointers and the second plurality of address pointers of other valid memory blocks of the plurality of valid memory blocks can form together an address chain covering all valid memory blocks of other valid memory blocks of the plurality of valid memory blocks.

In some embodiments, the method further comprises a step of: when data stored in one valid memory block of the plurality of valid memory blocks has been lost, restoring the data lost in the one valid memory block based on the check code data of the check factor and by reading data stored in respective valid memory blocks of the plurality of valid memory blocks with an address chain formed by the first plurality of address pointers and the second plurality of address pointers of other valid memory blocks of the plurality of valid memory blocks.

In some embodiments, the first plurality of address pointers are N address pointers, the second plurality of address pointers are N address pointers, and N is an integer greater than or equal to 2; the N address pointers set for one valid memory block point to one of N valid memory blocks that have been successfully written recently before the one valid memory block has been successfully written, respectively; the N address pointers of the check factor point to one of last N valid memory blocks which are successfully written in the valid memory blocks, respectively.

In some embodiments, the N address pointers of the first valid memory block that has been successfully written in the plurality of valid memory blocks of the plurality of memory blocks point to null, and for the N address pointers of the $(N-M)^{th}$ successfully written valid memory block in the plurality of memory blocks, (M+1) address pointers point to null, M is an integer greater than or equal to 0 and smaller than N.

In some embodiments, the address chain skips invalid memory blocks in the plurality of memory blocks automatically.

In some embodiments, the check code data of the check factor is generated based on data stored in all valid memory blocks of the plurality of memory blocks.

In some embodiments, the check code data of the check factor is generated by executing XOR operation on data stored in the plurality of valid memory blocks of the plurality of memory blocks.

In some embodiments, data lost in the one valid memory block is restored by executing XOR operation on the check code data and data stored in respective valid memory blocks read with the address chain.

In some embodiments, the memory is a 3D NAND flash memory.

According to another embodiment of the present disclosure, there is provided a data recovery method for a memory, the memory comprising a plurality of memory blocks, the method comprising: determining that data in one valid memory block of a plurality of valid memory blocks of the plurality of memory blocks has been lost; and restoring data lost in the one valid memory block based on check code data of a check factor and by reading data stored in respective valid memory blocks of the plurality of valid memory blocks with an address chain; wherein the check factor comprises the check code data and a first plurality of address pointers configured for the plurality of memory blocks, the address chain is formed by the first plurality of address pointers and a second plurality of address pointers set in each of the valid memory blocks, and each of the second plurality of address pointers in each of the valid memory blocks points to a respective one of other valid memory blocks, respectively, such that the address chain can cover all valid memory blocks of the plurality of valid memory blocks.

In some embodiments, the first plurality of address pointers are two address pointers, the second plurality of address pointers are two address pointers, and in case that data stored in one valid memory block of the plurality of valid memory blocks has been lost and the second plurality of address pointers configured for the one valid memory block have been lost, the first plurality of address pointers and the second plurality of address pointers of other valid memory blocks of the plurality of valid memory blocks can form together an address chain covering all valid memory blocks of other valid memory blocks of the plurality of valid memory blocks.

In some embodiments, while reading data stored in one valid memory block, the second plurality of address pointers stored in the one valid memory block is also read, and respective valid memory blocks to be read next are determined based on the second plurality of address pointers.

In some embodiments, the first plurality of address pointers are N address pointers, the second plurality of address pointers are N address pointers, and N is an integer greater than or equal to 2; the N address pointers set for one valid memory block point to one of N valid memory blocks that have been successfully written recently before the one valid memory block has been successfully written, respectively; the N address pointers of the check factor point to one of last N valid memory blocks which are successfully written in the valid memory blocks, respectively.

In some embodiments, data lost in the one valid memory block is restored by executing XOR operation on the check code data and data stored in respective valid memory blocks read with the address chain.

According to yet another embodiment of the present disclosure, there is provided a memory system, comprising: a memory comprising a plurality of memory blocks; and a memory controller coupled to the memory and configured to generate check code data of a check factor based on data stored in a plurality of valid memory blocks of the plurality of memory blocks; configure a first plurality of address pointers for the plurality of memory blocks in the check factor; and set a second plurality of address pointers in each of the valid memory blocks, wherein each of the second plurality of address pointers in each of the valid memory blocks points to a respective one of other valid memory blocks, respectively, and the first plurality of address pointers and the second plurality of address pointers of the plurality of valid memory blocks can form together an address chain covering all valid memory blocks of the plurality of valid memory blocks.

In some embodiments, the first plurality of address pointers are two address pointers, the second plurality of address pointers are two address pointers, and in case that data stored in one valid memory block of the plurality of valid memory blocks has been lost and the second plurality of address pointers configured for the one valid memory block have been lost, the first plurality of address pointers and the second plurality of address pointers of other valid memory blocks of the plurality of valid memory blocks can form together an address chain covering all valid memory blocks of other valid memory blocks of the plurality of valid memory blocks.

In some embodiments, the controller is further configured to, when data stored in one valid memory block of the plurality of valid memory blocks has been lost, restoring the data lost in the one valid memory block based on the check code data of the check factor and by reading data stored in respective valid memory blocks of the plurality of valid memory blocks with an address chain formed by the first plurality of address pointers and the second plurality of address pointers of other valid memory blocks of the plurality of valid memory blocks.

In some embodiments, the first plurality of address pointers are N address pointers, the second plurality of address pointers are N address pointers, and N is an integer greater than or equal to 2; the N address pointers set for one valid memory block point to one of N valid memory blocks that have been successfully written recently before the one valid memory block has been successfully written, respectively; the N address pointers of the check factor point to one of last N valid memory blocks which are successfully written in the valid memory blocks, respectively.

In some embodiments, the N address pointers of the first valid memory block that has been successfully written in the plurality of valid memory blocks of the plurality of memory blocks point to null, and for the N address pointers of the $(N-M)^{th}$ successfully written valid memory block in the plurality of memory blocks, (M+1) address pointers point to null, M is an integer greater than or equal to 0 and smaller than N.

In some embodiments, the address chain skips invalid memory blocks in the plurality of memory blocks automatically.

In some embodiments, the controller is configured to generate the check code data of the check factor based on data stored in all valid memory blocks of the plurality of memory blocks.

In some embodiments, the controller is configured to generate the check code data of the check factor by executing XOR operation on data stored in the plurality of valid memory blocks of the plurality of memory blocks.

In some embodiments, the controller is configured to restore data lost in the one valid memory block by executing XOR operation on the check code data and data stored in respective valid memory blocks read with the address chain.

In some embodiments, the memory is a 3D NAND flash memory.

According to yet another embodiment of the present disclosure, there is provided a memory system, comprising: a memory comprising a plurality of memory blocks; and a memory controller coupled to the memory and configured to determine that data in one valid memory block of a plurality of valid memory blocks of the plurality of memory blocks has been lost; and restore data lost in the one valid memory block based on check code data of a check factor and by reading data stored in respective valid memory blocks of the plurality of valid memory blocks with an address chain; wherein the check factor comprises the check code data and a first plurality of address pointers configured for the plurality of memory blocks, the address chain is formed by the first plurality of address pointers and a second plurality of address pointers set in each of the valid memory blocks, and each of the second plurality of address pointers in each of the valid memory blocks points to a respective one of other valid memory blocks, respectively, such that the address chain can cover all valid memory blocks of the plurality of valid memory blocks.

In some embodiments, the first plurality of address pointers are two address pointers, the second plurality of address pointers are two address pointers, and in case that data stored in one valid memory block of the plurality of valid memory blocks has been lost and the second plurality of address pointers configured for the one valid memory block have been lost, the first plurality of address pointers and the second plurality of address pointers of other valid memory blocks of the plurality of valid memory blocks can form together an address chain covering all valid memory blocks of other valid memory blocks of the plurality of valid memory blocks.

In some embodiments, the memory controller is configured to, while reading data stored in one valid memory block, the second plurality of address pointers stored in the one valid memory block is also read, and respective valid memory blocks to be read next are determined based on the second plurality of address pointers.

In some embodiments, the first plurality of address pointers are N address pointers, the second plurality of address pointers are N address pointers, and N is an integer greater than or equal to 2; the N address pointers set for one valid memory block point to one of N valid memory blocks that have been successfully written recently before the one valid memory block has been successfully written, respectively; the N address pointers of the check factor point to one of last N valid memory blocks which are successfully written in the valid memory blocks, respectively.

In some embodiments, the memory controller is configured to restore data lost in the one valid memory block by executing XOR operation on the check code data and data stored in respective valid memory blocks read with the address chain.

According to yet another embodiment of the present disclosure, there is provided a memory system, comprising: a memory comprising a memory region for verification and a plurality of memory blocks; and a memory controller coupled to the memory; wherein the memory region for verification stores a check factor corresponding to a plurality of valid memory blocks of the plurality of memory blocks and the check factor includes a check code data and a first plurality of address pointers configured for the plurality of memory blocks; each of the valid memory blocks is configured with a second plurality of address pointers, wherein each of the second plurality of address pointers in each of the valid memory blocks points to a respective one of other valid memory blocks, respectively; and wherein the first plurality of address pointers and the second plurality of address pointers of the plurality of valid memory blocks can form together an address chain covering all valid memory blocks of the plurality of valid memory blocks.

BRIEF DESCRIPTION OF THE DRAWINGS

Accompanying drawings, which are incorporated herein and form a part of the description, illustrate embodiments of the present disclosure and, together with the description, further serve to explain the principles of the present disclosure and enable those skilled in the art to make and use the present disclosure.

FIG. 3 illustrates a flow chart of a data protection method for memory according to an embodiment of the present disclosure;

DETAILED DESCRIPTION

The subject matter described herein will be discussed now with reference to example implementations. It should be understood that these implementations are discussed only for the purpose of enabling those skilled in the art to better understand and in turn implement the subject matter described herein rather than limiting the protection scope, application or examples set forth in claims. The functions and arrangements of elements discussed may be modified without departing from the scope of the present disclosure. Various processes or components may be omitted, replaced and added as desired for various examples. For example, the described method may be executed in an order different from the described order and various steps may be added, omitted or combined. Additionally, features described with respect to some examples may also be combined in other examples.

It is to be noted that references to "one embodiment", "an embodiment" and "some embodiments" in the description means the described embodiments may include a particular feature, structure or characteristic, but every embodiment may not necessarily include the particular feature, structure or characteristic. Moreover, such phrases do not necessarily refer to the same embodiment. In addition, when a particular feature, structure or characteristic is described in connection with an embodiment, it would be within the knowledge of a person skilled in the pertinent art to affect such feature, structure or characteristic in connection with other implementations explicitly or not explicitly described.

While embodiments of the present disclosure will be described with reference to 3D NAND flash memory devices, it should be understood that the innovative concepts of the present disclosure should not be limited thereto. For example, without departing from the scope of the present disclosure, the present disclosure is applicable to other nonvolatile memory devices such as electrically erasable programmable ROM (EEPROM), NOR flash, phase change RAM (PRAM), magnetic RAM (MRAM), resistive RAM (RRAM), and ferroelectric RAM (FRAM), etc.

Figure 1:
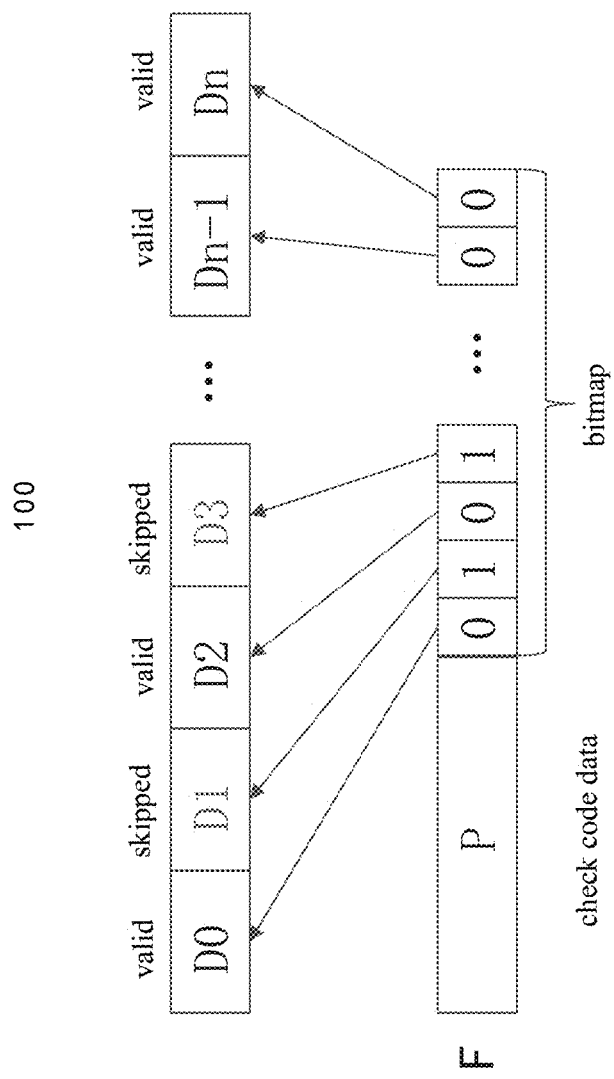
FIG. 1 illustrates a schematic diagram of a data protection method for memory according to an embodiment of the present disclosure.

FIG. 1 illustrates a schematic diagram of a data protection method for memory according to an embodiment of the present disclosure. As shown in FIG. 1, which data has been skipped is recorded in form of a bitmap. That is, the bitmap data serves as an additional data of the check factor F. As illustrated in FIG. 1, a 3D NAND flash memory 100 includes memory block D0, memory block D1, memory block D2, . . . and memory block Dn. In the writing process of the 3D NAND flash memory 100, a memory block that has been successfully written is marked as "valid" and denoted with "0" in the bitmap, a memory block whose written part of the data is unavailable due to incomplete writing is marked as "skipped" and denoted with "1" in the bitmap. In order to restore data that has been successfully written into one valid memory block and lost after the writing is finished with RAID, unavailable data in the memory blocks marked as "1" will be skipped when the check code data is calculated based on data stored in a plurality of valid memory blocks, and unavailable data in the memory blocks marked as "1" will also be skipped when data lost in the one valid memory block is restored with the check code data.

However, large memory space will be occupied even if the additional data is compressed in form of bitmap. In the data protection method for a memory as shown in FIG. 1, in case that the RAID ratio (the amount of protected data versus the amount of check factor) is 127:1, the bitmap will occupy 16 bytes; and in case that the RAID ratio is 255:1, the bitmap will even occupy 32 bytes. In case that the bitmap that serves as the additional data of check factors F will occupy 16 bytes or 32 bytes, it will result in a waste of 16 or 32 bytes of space of each of valid memory blocks into which data cannot be stored. This is because even if data is written into the space of each valid memory block, RAID technology cannot be used to restore the data that was successfully written into the space of one valid memory block and later lost after the writing is finished. Therefore, in addition to the need to reserve a large space in the check factor F for the additional data (for example, bitmap), which significantly reduces ECC error correction capability of the system, each valid memory block also wastes space of same size as the additional data.

Figure 2:
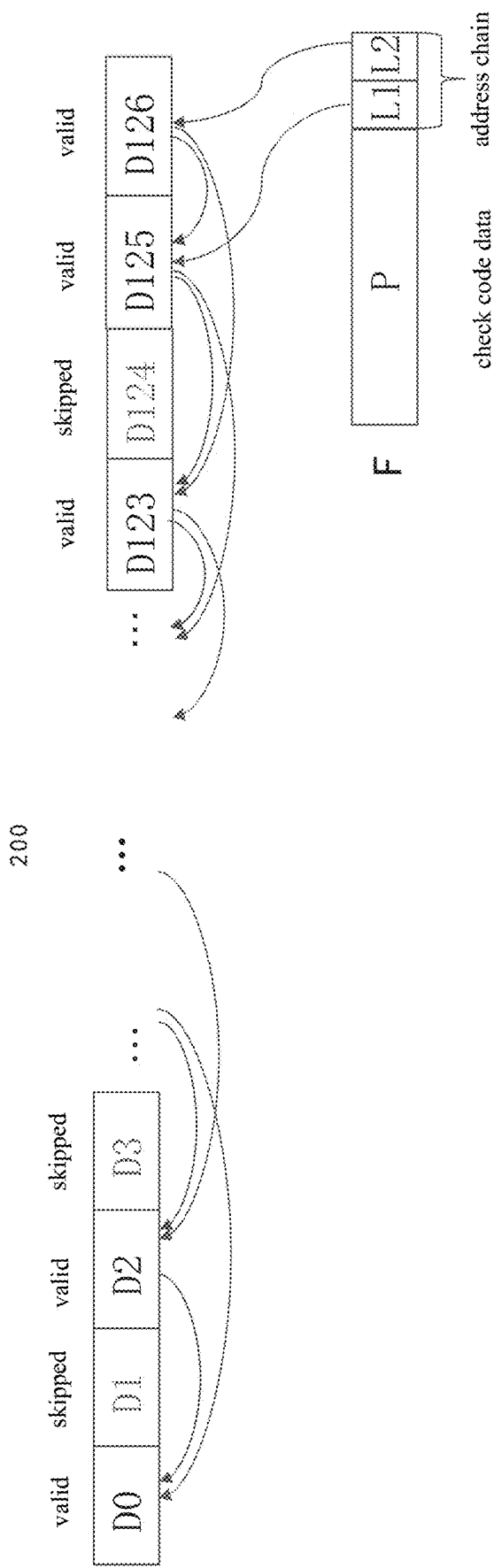
FIG. 2 illustrates a schematic diagram of a data protection method for memory according to another embodiment of the present disclosure.

FIG. 2 illustrates a schematic diagram of a data protection method for memory according to another embodiment of the present disclosure. As illustrated in FIG. 2, a 3D NAND flash memory 200 includes memory block D0, memory block D1, memory block D2, . . . and memory block D126.

As illustrated in FIG. 2, in the writing process of the 3D NAND flash memory 200, the memory blocks D into which the data has been successfully written are marked as "valid", such as memory block D0, memory block D2, . . . , memory block D123, memory block D125, and memory block D126. The memory blocks D into which the data has not be successfully written due to certain reasons such as power down, writing failure in the writing process will be marked as "skipped", such as memory block D1, memory block D3, . . . and memory block D124, and data stored in the memory blocks marked as "skipped" is unavailable. That is, after the writing of the memory 200 is finished, if data stored in one valid memory block D is lost and the data lost in the one valid memory block D will be restored with RAID technology, data written into memory blocks D marked as "skipped" cannot be used when the check code data P for restoring data lost in the one valid memory block D is calculated.

As illustrated in FIG. 2, the check code data P may be generated by executing "XOR" operation on data stored in a plurality of valid memory blocks D of all memory blocks of the 3D NAND flash memory 200. In one embodiment, the check code data P may be generated by executing "XOR" operation on data stored in all valid memory blocks D of the 3D NAND flash memory 200. XOR is a logic operation on two operands in which logic value "1" is generated if the two values undergoing XOR are different; and logic value "0" is generated if the two values undergoing XOR are identical. For example, if data stored in valid memory block D0 is "11001010", and data stored in valid memory block D2 is "10000011", then the result of "XOR" operation is "01001001". Next, an "XOR" operation is executed again on the above result and data stored in the next valid memory block D, until "XOR" operations have been executed on data in all the valid memory blocks D, thereby obtaining the check code data P.

As shown in FIG. 1, in addition to the check code data P, the check factor F for restoring data which has been lost after the writing of one valid memory block D also includes an additional data. However, unlike the bitmap used as the additional data of the check factor F in FIG. 1, an address chain is used as the additional data of the check factor F in FIG. 2. For example, as shown in FIG. 2, in addition to the check code data P obtained by executing "XOR" operations on data stored in a plurality of valid memory blocks D, the check factor F further includes two address pointers L1, L2 pointing to respective one of valid memory blocks D of the 3D NAND flash memory 200, respectively. In one embodiment, the two address pointers L1, L2 record number of the respective one of valid memory blocks D, respectively. In this case, if the RAID ratio is 127:1, the two address pointers L1, L2 would only occupy two bytes of space; and if the RAID ratio is 255:1, the two address pointers L1, L2 would only occupy four bytes of space.

As illustrated in FIG. 2, the two address pointers L1, L2 as the additional data of the check factor F may point to one of the last two valid memory blocks which are successfully written in the 3D NAND flash memory 200, respectively. For example, the address pointer L2 points to the last valid memory block D126 which is successfully written, and the address pointer L1 points to the penultimate valid memory block D125 which is successfully written. It is appreciated that the case as shown in FIG. 2 is illustrative. If the last memory block D126 is marked as "skipped", and the last valid memory block which is successfully written is D125 and the penultimate valid memory block which is successfully written is D124, the address pointer L2 that serves as the additional data of the check factor F will point to the valid memory block D125 and the address pointer L1 will point to the valid memory block D124.

As the bitmap serving as the additional data of the check factor F in FIG. 1, in case that the two address pointers L1, L2 of the check factor F in FIG. 2 occupy two bytes of space, in addition to the data which has been written into each valid memory block D, it also occupies two bytes of space to store the two address pointers $D_{L1}$ and $D_{L2}$, which point to one of two valid memory blocks D that have been successfully written recently before the current valid memory block D has been successfully written, respectively. As illustrated in FIG. 2, in addition to the stored data, the valid memory block D126 further stores two address pointers $D126_{L1}$ and $D126_{L2}$, the address pointer $D126_{L2}$ points to the last valid memory block (for example, D125) which has been successfully written before the valid memory block D126 has been successfully written, and the address pointer $D126_{L1}$ points to the penultimate valid memory block (for example, D123) which has been successfully written before the valid memory block D126 has been successfully written. As shown in FIG. 2, the memory block D124 is marked as "skipped". Although the memory block D124 is closer to the valid memory block D126 than the memory block D123, the address pointer $D126_{L1}$ will not point to the memory block D124. Similarly, in addition to the stored data, the valid memory block D125 further stores two address pointers $D125_{L1}$ and $D125_{L2}$, the address pointer $D125_{L2}$ points to the last valid memory block (for example, D123) which has been successfully written before the valid memory block D125 has been successfully written, and the address pointer $D125_{L1}$ points to the penultimate valid memory block (for example, D122 (not shown in FIG. 2)) which has been successfully written before the valid memory block D125 has been successfully written. As shown in FIG. 2, the memory block D124 is marked as "skipped". Although the memory block D124 is closer to the valid memory block D125 than the memory block D123, the two address pointer D$125_{L1}$ and D$125_{L2}$ of the valid memory block D125 will not point to the memory block D124. And so on, it is possible to determine the memory blocks to which the two address pointers $D_{L1}$, $D_{L2}$ stored in each valid memory block D point.

As illustrated in FIG. 2, the writing process of 3D NAND flash memory 200 is described as follows: first, the memory block D0 is written, and if the writing of memory block D0 is successful (marked as "valid"), the two address pointers D$0_{L1}$, D$0_{L2}$ of the valid memory block D0 point to null since no memory block D has been successfully written before the memory block D0 has been successfully written; next, the memory block D1 is written and memory block D1 is not successfully written due to some reasons such as power down during the writing process (marked as "skipped"); next, the writing process restores and the memory block D2 is written, if the memory block D2 is successfully written (marked as "valid"), the address pointer D$2_{L2}$ of the valid memory block D2 points to the valid memory block D0, and the address pointer D$2_{L1}$ of the valid memory block D2 points to null since only the memory block D0 has been successfully written before the memory block D2 is successfully written; next, the memory block D3 is written and memory block D3 is not successfully written due to some reasons such as power down during the writing process (marked as "skipped"); next, the writing process restores and the memory block D4 (not shown in FIG. 2) is written, if the memory block D4 is successfully written, since memory block D0 and memory block D2 have been successfully written before the memory block D4 is successfully written, the address pointer D$4_{L2}$ of the valid memory block D4 points to the last valid memory block D2 which has been successfully written before the memory block D4 is successfully written and the address pointer D$4_{L1}$ of the valid memory block D4 points to the penultimate valid memory block D0 which has been successfully written before the memory block D4 is successfully written, . . . , so on and so on, until all the memory blocks have been written.

After the writing of the 3D NAND flash memory 200 has been finished, if data stored in one valid memory block D is lost, it is possible to restore the data lost in the one valid memory block D with RAID technology. Specifically, in order to restore the data lost in the one valid memory block D, in addition to obtaining the check code data P based on the data stored in all the successfully written valid memory blocks D in the plurality of memory blocks of the 3D NAND flash memory 200 during the writing process, it is also required to read data stored in the other valid memory blocks D other than the one valid memory block D in which the stored data has been lost. In order to read data stored in the other valid memory blocks D other than the one valid memory block D in which the stored data has been lost, data stored in respective valid memory blocks D may be read by the address chain formed by the address pointer in the check factor F and the address pointers in the other valid memory blocks D other than the one valid memory block D in which the stored data has been lost. For example, after the writing of the 3D NAND flash memory 200 has been finished, assuming that data stored in the valid memory block D123 has been lost, in order to restore data lost in the valid memory block D123, it is known that the memory block D126 has been successfully written according to the address pointer L2 in the check factor F and thus data stored in the valid memory block D126 should be read; next, it is known that the memory block D125 has been successfully written according to the address pointer D$126_{L2}$ of the valid memory block D126 and thus data stored in the valid memory block D125 should be read; next, although the address pointer D$125_{L2}$ of the valid memory block D125 points to the memory block D123, data stored in the memory block D123 has been lost and cannot be read. In this case, it is known that the memory block D122 (not shown in FIG. 2) has been successfully written according to the address pointer D$125_{L1}$ of the valid memory block D125 and thus data stored in the valid memory block D122 should be read; next, according to the address pointer D$122_{L2}$ of the valid memory block D122, . . . ; and so on, until data stored in the valid memory block D0 has also been read. Therefore, the memory blocks D marked as "skipped" in the 3D NAND flash memory 200 and the valid memory block D123 in which the stored data has been lost may be skipped automatically by the address chain formed by the address pointer in the check factor F and the address pointers in the other valid memory blocks D other than the valid memory block D123 in which the stored data has been lost. That is, the address chain automatically skips invalid memory blocks of the plurality of memory blocks D in the 3D NAND flash memory 200. After obtaining the check code data P based on the data stored in all the valid memory blocks D in the 3D NAND flash memory 200 during the writing process and reading data stored in the other valid memory blocks D other than the valid memory block D123 in which the stored data has been lost, it is possible to execute "XOR" operation on the check code data P and the data stored in respective valid memory blocks D read by the address chain formed by the address pointer in the check factor F and the address pointers in the other valid memory blocks D other than the valid memory block D123 in which the stored data has been lost, to restore data lost in the valid memory block D123.

In the embodiment shown in FIG. 2, after the writing of the 3D NAND flash memory 200 has been finished, if data stored in the valid memory block D126 is lost, in order to restore the data lost later in the valid memory block D126 with RAID technology, it is required to read data stored in the other valid memory blocks D other than the valid memory block D126. Although the address pointer L2 in the check factor F points to the memory block D126, it cannot read data stored in the memory block D126. In this case, it is possible to read data stored in the valid memory block D125 first according to the address pointer L1 in the check factor F which points to the valid memory block D125. Next, according to the address pointer D$125_{L2}$ of the valid memory block D125, it is known that the memory block D123 has been successfully written and thus it is required to read data stored in the valid memory block D123; and next, according to the address pointer D$123_{L2}$ of the valid memory block D123, . . . ; and so on, until data stored in the valid memory block D0 has been read. As stated above, after obtaining the check code data P based on the data stored in all the valid memory blocks D of the 3D NAND flash memory 200 during the writing process and reading data stored in the other valid memory blocks D other than the valid memory block D126 in which the stored data has been lost by the address chain formed by the address pointer in the check factor F and the address pointers in the other valid memory blocks D other than the valid memory block D126, it is possible to execute "XOR" operation on the check code data P and the read data stored in respective valid memory blocks D to restore data lost in the valid memory block D126.

In one embodiment, it is possible to execute "XOR" operation on the generated check code data P and data stored in respective valid memory blocks read by the address chain to restore data lost in one valid memory block D after the writing has been finished. For example, still referring to the method shown in FIG. 2 as an example, it is assumed that data stored in the valid memory block D123 is lost after the writing of the 3D NAND flash memory 200 has been finished. In order to restore data lost in the valid memory block D123, it is possible to first execute "XOR" operation on the generated additional check code P and the data stored in valid memory block D126 read by the address pointer L2 in the check factor F; and then execute "XOR" operation again on the result and the data stored in valid memory block D125 read by the address pointer L2 of the valid memory block D126; and then execute "XOR" operation again on the result and the data stored in valid memory block D122 (not shown in FIG. 2) read by the address pointer L1 of the valid memory block D125; . . . , until execute "XOR" operation again on the result and the read data stored in valid memory block D2, thereby obtaining the final result of the plurality of "XOR" operations, which is also the result of executing "XOR" operation on data stored in the valid memory block D0 and the data originally stored in the valid memory block D123. Accordingly, it is possible to restore data lost in the valid memory block D123 after the writing process has been finished by executing "XOR" operations on the generated check code data P and data stored in respective valid memory blocks read by address chain.

In the embodiment shown in FIG. 2, the two address pointers L1, L2 of the check factor F point to one of last two valid memory blocks which are successfully written in the valid memory blocks D of the 3D NAND flash memory 200, respectively. When data stored in one valid memory block D other than the last valid memory block D which is successfully written is lost, data stored in the other valid memory blocks D other than the one valid memory block D in which the stored data has been lost can be read with the address chain formed by the address pointer L2 of the check factor F and the address pointers of the other valid memory blocks D other than the one valid memory block D. In addition, even when data stored in the last valid memory block D (such as memory block D126) which is successfully written is lost later, it is also possible to read data stored in the other valid memory blocks D other than the last valid memory block D with the address chain formed by the address pointer L1 of the check factor F and the address pointers of the other valid memory blocks D other than the last valid memory block D. According to the location of the valid memory block D in which the stored data has been lost, one of the two address pointers L1, L2 of the check factor F can be selected as a header-chain. In this case, it is possible to read data stored in respective valid memory blocks D by the selected address chain and thus chain-breaking will not occur. On the contrary, if the check factor F has only one address pointer L and the address pointer L points to the last valid memory block D which is successfully written (such as the valid memory block D126), when data stored in valid memory block D126 is lost, it is impossible to read data stored in the other valid memory blocks D other than the valid memory block D126. That is, chain-breaking will occur and thus data lost in memory block D126 cannot be restored with RAID technology.

In addition, in case that the RAID ratio is 127:1, if the skipped data is recorded in form of bitmap as shown in FIG. 1, the bitmap as the additional data of the check factor F would occupy 16 bytes of space and each valid memory block D would waste 16 bytes of space accordingly; if an address chain is used to record which memory blocks have been successfully written as shown in FIG. 2, the address chain as the additional data of the check factor F would occupy only 2 bytes of space and each valid memory block D would only waste 2 bytes of space accordingly, thereby significantly saving memory space.

It is appreciated that the check factor F including two address pointers L1, L2 and each valid memory block D including two address pointers as shown in FIG. 2 is only illustrative. In one embodiment, the check factor F may include N address pointers (N is an integer greater than or equal to 2) that point to one of last N valid memory blocks that have been successfully written in the valid memory blocks D of the 3D NAND flash memory 200, respectively. In this case, in addition to the written data, each valid memory block D also includes N address pointers (N is an integer greater than or equal to 2) that point to one of N valid memory blocks D that have been successfully written recently before the respective valid memory block D has been successfully written, respectively. For example, the check factor F may include three address pointers L1, L2, L3 and each valid memory block D may include three address pointers, the address pointer L3 of the check factor F points to the last valid memory block which is successfully written in the valid memory blocks D, the address pointer L2 points to the penultimate valid memory block which is successfully written in the valid memory blocks D, and the address pointer L1 points to the antepenultimate valid memory block which is successfully written in the valid memory blocks D. Accordingly, the three address pointers of each valid memory block D points to one of three valid memory blocks which are successfully written recently before the valid memory block D has been successfully written, respectively.

FIG. 3 illustrates a flow chart of a data protection method for a memory according to an embodiment of the present disclosure; the memory comprises a plurality of memory blocks. As shown in FIG. 3, the method 300 comprises: generating check code data of a check factor based on data stored in a plurality of valid memory blocks of the plurality of memory blocks (step S310); configuring a first plurality of address pointers for the plurality of memory blocks in the check factor (step S320); and setting a second plurality of address pointers in each of the valid memory blocks, wherein each of the second plurality of address pointers in each of the valid memory blocks points to a respective one of other valid memory blocks, respectively, and the first plurality of address pointers and the second plurality of address pointers of the plurality of valid memory blocks can form together an address chain covering all valid memory blocks of the plurality of valid memory blocks (step S330). Steps S310-S330 will be described below.

Step S310: generating check code data of a check factor based on data stored in a plurality of valid memory blocks of the plurality of memory blocks. Still referring to the method shown in FIG. 2 as an example, during the writing process of the 3N NAND flash memory, it is possible to execute "XOR" operation on data stored in all the valid memory blocks D to generate the check code data P of the check factor F.

Step S320: configuring a first plurality of address pointers for the plurality of memory blocks in the check factor. As shown in FIG. 2, in addition to the check code data P obtained in step S310, the check factor F further includes two address pointers L1, L2 configured for the plurality of memory blocks as additional data, which point to one of last two valid memory blocks which are successfully written in the plurality of valid memory blocks, respectively.

Step S330: setting a second plurality of address pointers in each of the valid memory blocks, wherein each of the second plurality of address pointers in each of the valid memory blocks points to a respective one of other valid memory blocks, respectively, and the first plurality of address pointers and the second plurality of address pointers of the plurality of valid memory blocks can form together an address chain covering all valid memory blocks of the plurality of valid memory blocks. Still referring to the method shown in FIG. 2 as an example, in addition to the written data, each valid memory block D is further configured with two address pointers which point to one of two valid memory blocks which have been successfully written recently before the valid memory block D has been successfully written, respectively. The two address pointers L1, L2 of the check factor F and the two address pointers of each valid memory block D can form together an address chain covering all valid memory blocks D.

Figure 4:
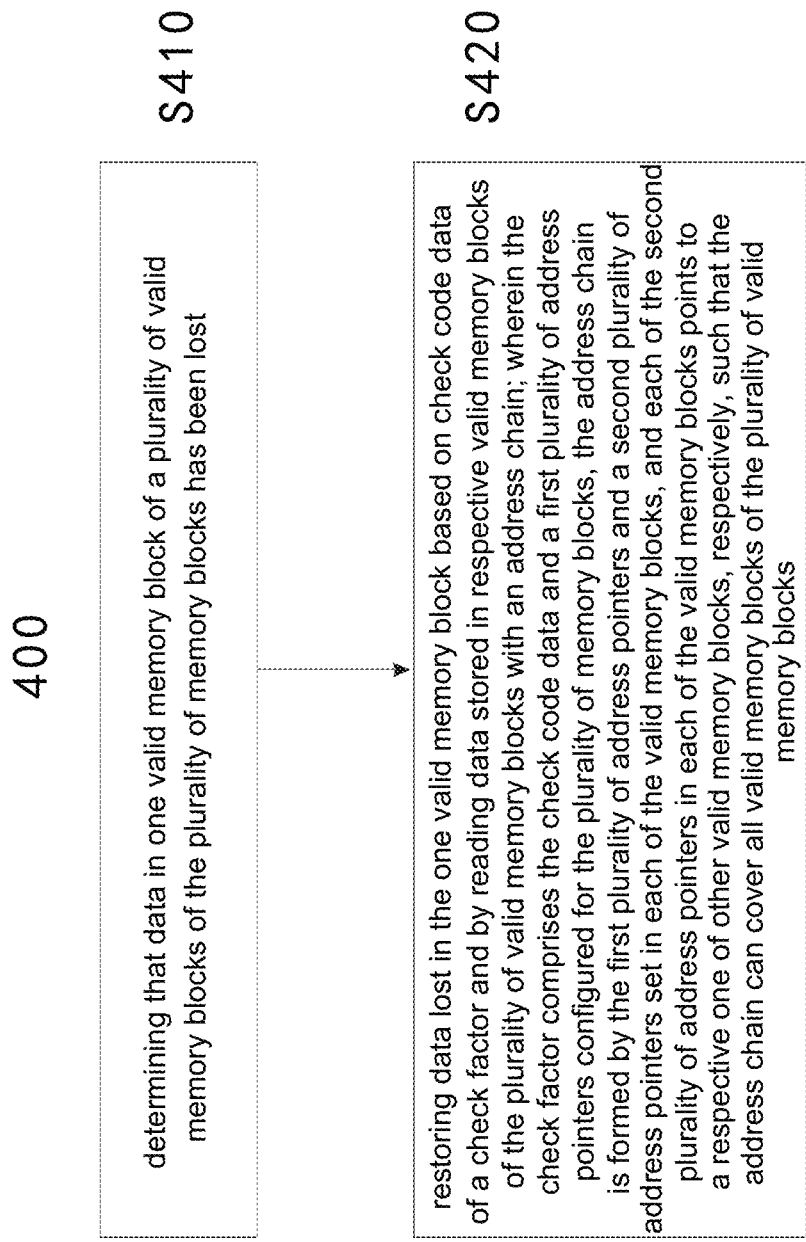
FIG. 4 illustrates a flow chart of a data recovery method for memory according to an embodiment of the present disclosure.

FIG. 4 illustrates a flow chart of a data recovery method for a memory according to an embodiment of the present disclosure, the memory comprises a plurality of memory blocks. As shown in FIG. 4, the method 400 comprises: determining that data in one valid memory block of a plurality of valid memory blocks of the plurality of memory blocks has been lost (step S410); and restoring data lost in the one valid memory block based on check code data of a check factor and by reading data stored in respective valid memory blocks of the plurality of valid memory blocks with an address chain; wherein the check factor comprises the check code data and a first plurality of address pointers configured for the plurality of memory blocks, the address chain is formed by the first plurality of address pointers and a second plurality of address pointers set in each of the valid memory blocks, and each of the second plurality of address pointers in each of the valid memory blocks points to a respective one of other valid memory blocks, respectively, such that the address chain can cover all valid memory blocks of the plurality of valid memory blocks (step S420).

Still referring to the method shown in FIG. 2 as an example, it is first determined that data in one valid memory block D of the plurality of valid memory block has been lost. For example, it is determined that data stored in the memory block D123 has been lost after the writing process. Then data stored in the other valid memory blocks D other than the valid memory block D123 has been read. In order to read data stored in the other valid memory blocks D, it is possible to read data stored in all valid memory blocks D other than the valid memory block D123 with the address chain formed by the two address pointers of the check factor F and the address pointers of the other valid memory blocks D. Finally, it is possible to execute "XOR" operation on the check code data P obtained based on data stored in all valid memory blocks D of the 3D NAND flash memory 200 during the writing process and data stored in all valid memory blocks D other than the valid memory block D123 read with the address chain to restore data lost in the memory block D123.

Figure 5:
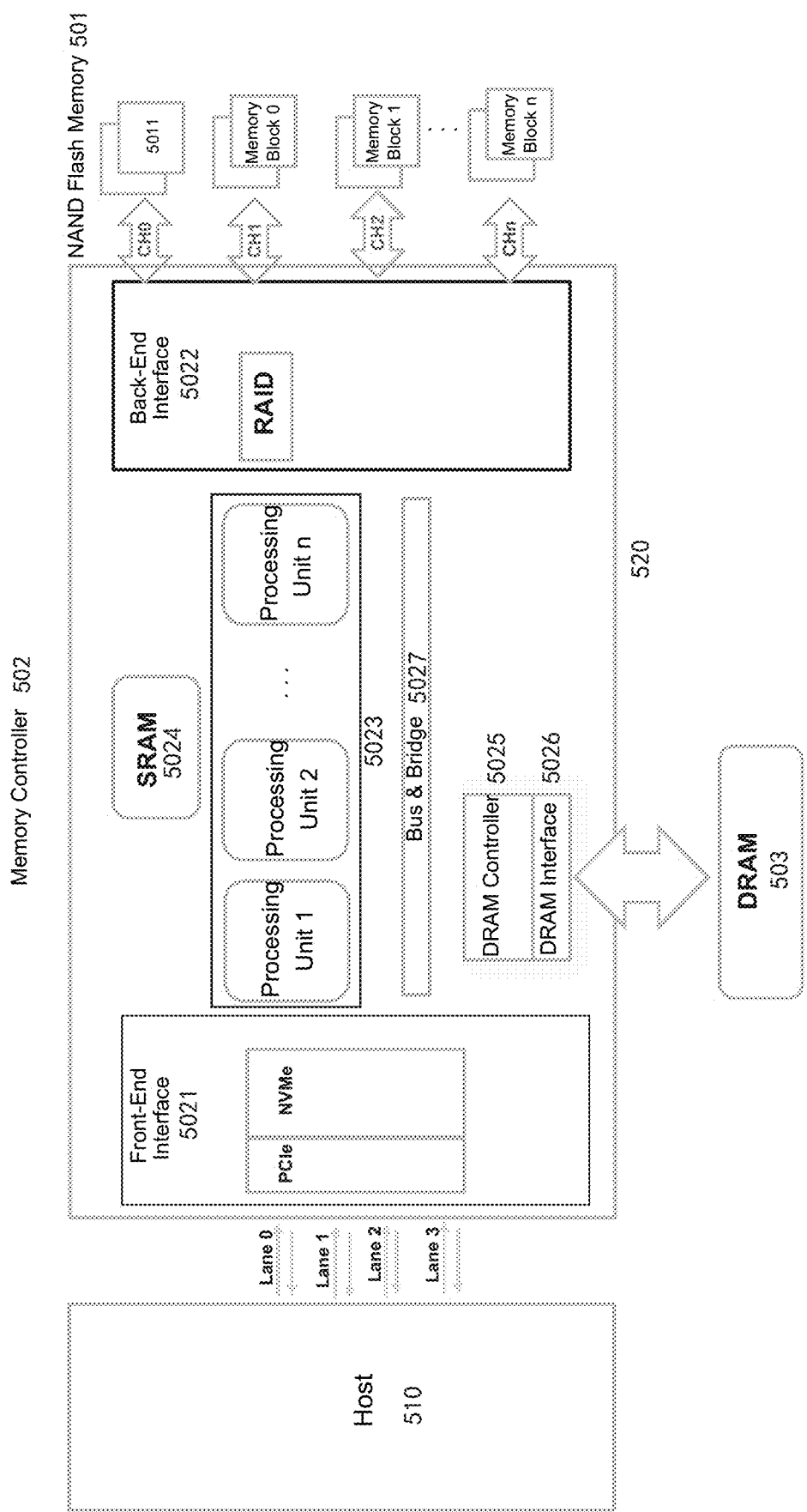
FIG. 5 illustrates a schematic diagram of a memory system according to an embodiment of the present disclosure.

FIG. 5 illustrates a schematic diagram of a system 500 with a memory according to an embodiment of the present disclosure. The system 500 may be a mobile phone, a desktop computer, a laptop computer, a tablet computer, a game console, a printer, a positioning equipment, a wearable electronic device, a smart sensor, a virtual reality (VR) device, an augmented reality (AR) device or any other suitable electronic devices with memories. As shown in FIG. 5, system 500 may include a host 510 and a memory system 520 having one or more memories 501 and a memory controller 502. The host 510 may be configured to send data to the memory 501 or receive data from the memory 501.

The memory 501 may be any memory disclosed herein, such as the 3D NAND flash memory including a memory region for verification 5011 and a plurality of memory blocks such as memory block 0, memory block 1, memory block 2, . . . and memory block n. The memory region for verification 5011 stores a check factor corresponding to a plurality of valid memory blocks of the plurality of memory blocks and the check factor includes a check code data and a first plurality of address pointers configured for the plurality of memory blocks. In addition, each valid memory block of the plurality of memory blocks of the memory 501 is configured with a second plurality of address pointers, each of the second plurality of address pointers in each of the valid memory blocks points to a respective one of other valid memory blocks. The first plurality of address pointers and the second plurality of address pointers of the plurality of valid memory blocks may form together an address chain covering all valid memory blocks of the plurality of valid memory blocks.

As shown in FIG. 5, the memory controller 502 includes a front-end interface 5021 coupled to the host 510 through lanes Lane 0, Lane 1 and Lane 3 and a back-end interface 5022 coupled to the memory region for verification 5011 and respective memory blocks through channels CH0, CH1, . . . and CHn. The front-end interface 5021 may communicate with the host 510 according to a specific communication protocol such as PCIe and NVMe and the back-end interface 5022 includes a RAID module. Specifically, the RAID module may be implemented by the firmware written by for example the controller of the back-end interface 5022, or may be implemented by special-purpose hardware engine circuitry.

In one embodiment, the RAID module may be configured to generate check code data of a check factor based on data stored in a plurality of valid memory blocks of the plurality of memory blocks of the memory 501; configure a first plurality of address pointers for the plurality of memory blocks in the check factor; and set a second plurality of address pointers in each of the valid memory blocks, wherein each of the second plurality of address pointers in each of the valid memory blocks points to a respective one of other valid memory blocks, respectively, and the first plurality of address pointers and the second plurality of address pointers of the plurality of valid memory blocks can form together an address chain covering all valid memory blocks of the plurality of valid memory blocks. In another embodiment, the RAID module may be configured to determine that data in one valid memory block of a plurality of valid memory blocks of the plurality of memory blocks of the memory 501 has been lost; and restore data lost in the one valid memory block based on check code data of a check factor and by reading data stored in respective valid memory blocks of the plurality of valid memory blocks with an address chain; wherein the check factor comprises the check code data and a first plurality of address pointers configured for the plurality of memory blocks, the address chain is formed by the first plurality of address pointers and a second plurality of address pointers set in each of the valid memory blocks, and each of the second plurality of address pointers in each of the valid memory blocks points to a respective one of other valid memory blocks, respectively, such that the address chain can cover all valid memory blocks of the plurality of valid memory blocks.

The memory controller 502 further includes a processing module 5023 having a processing unit 1, a processing unit 2, ... and a processing unit n. The processing unit may be configured with corresponding firmware such as one implementing FTL (Flash to Logic) function for controlling operations such as reading, erasing and programming of the memory 501 based on the received instructions from the host 510. The memory controller 502 further includes a static random-access memory (SRAM) 5024, a dynamic random-access memory (DRAM) controller 5025 and a dynamic random-access memory (DRAM) interface 5026, wherein the dynamic random-access memory (DRAM) interface 5026 is coupled to the dynamic random-access memory (DRAM) 503. As illustrated in FIG. 5, various components of the memory controller 502 may be connected to the bus & bridge 5027.

As described above, by using the address chain as an additional data of a check factor, the memory system 520 according to an embodiment of the present disclosure can significantly reduce space demand for the additional data of the check factor, maintain the ECC error correction capability of the system and significantly reduce space waste of the memory.

According to one embodiment, there is provided a computer readable storage medium having a program code stored thereon, when it is executed by a processor, enables the processor to carry out the operations and functions of embodiments described in the description with respect to FIGS. 1-4. In particular, it may be provided a system or a device configured with readable storage medium having software program code stored thereon for implementing functions of any embodiment of the above-described embodiments and enabling the computer or processor of the system or device to read and execute instructions stored in the readable storage medium.

Embodiments of the readable storage medium include non-volatile storage card and ROM. Optionally, it is possible for the communication network to download program codes from the server computer or cloud.

It is to be noted that in the above-described flowcharts and system structure diagrams, not all steps and units are necessary, and some steps or units may be omitted according to practical demand. The order in which steps are carried out is not fixed and may be determined as desired. The device structures described in the above embodiments may be physical structures or logic structures. That is, some units may be implemented with the same physical entity, or some units may be implemented with a plurality of physical entities or may be implemented with some components in a plurality of independent devices together.

The controller has been described with reference to various devices and methods. The controller may be implemented with electronic hardware, computer software or any combination thereof. Whether the controller is implemented as hardware or software depends on specific applications and overall design constrains imposed on the system. As an example, the controller, any part of the controller or any combination of controllers presented in this disclosure may be implemented as a microprocessor, a microcontroller, a digital signal processor (DSP), a field programmable gate array (FPGA), a programmable logic device (PLD), a state machine, a gate logic, a discrete hardware circuitry and any other suitable processing component configured to implement functions described in this disclosure. Functions of the controller, any part of the controller or any combination of controllers presented in this disclosure may be implemented as software executed by a microprocessor, a microcontroller, a DSP or other suitable platform.

The above description of the present disclosure has been provided to enable those of ordinary skill in the art to implement or use contents of the present disclosure. For those of ordinary skill in the art, it is obvious to make various modifications to the present disclosure and it is also possible to apply the general principle as defined herein to other variants without departing from the scope of the present disclosure. Therefore, the present disclosure is not limited to the examples and designs as described herein, but is consistent with the broadest scope according to the principle and novel features disclosed herein.

What is claimed is:

1. A system, comprising:
    a memory device configured to store memory data, the memory device comprising a plurality of valid memory blocks, and the plurality of valid memory blocks comprising a first valid memory block and a second valid memory block, and
    a controller comprising a processor and a memory, the controller operatively coupled to the first valid memory block and second valid memory block, and the controller configured to, in an operation on redundant array of independent disks (RAID),
        generate an address chain as part of a check code factor of the plurality of valid memory blocks, the address chain comprising a first address pointer pointing to the first valid memory block and another address pointer pointing to the second valid memory block;
        generate, for storage in the first valid memory block, a second address pointer, the second address pointer pointing to the second valid memory block;
        in response to the first valid memory block not being lost, use the first address pointer stored in the address chain that is part of the check code factor to read the first valid memory block, and use the second address pointer in the first valid memory block to read the second valid memory block; and
        in response to the first valid memory block being lost, use the another address pointer in the address chain to read the second valid memory block.

2. The system of claim 1, wherein:
    the memory device further comprising a third valid memory block, and
    the controller is configured to:
        generate another first address pointer as part of the address chain in the check code factor, the another first address pointer pointing to the second valid memory block; and
        generate, for storage in the first valid memory block, another second address pointer, the another second address pointer pointing to the third valid memory block.

3. The system of claim 2, wherein a write operation of the third valid memory block is completed prior to a write operation of the first valid memory block.

4. The system of claim 1, wherein the controller is further configured to:
    generate, in the second valid memory block, a respective second address pointer and a respective other second address pointer, the respective second address pointer and the respective other second address pointer each pointing to a different valid memory block of which a writing operation is completed prior to that of the second valid memory block.

5. The system of claim 1, wherein:
a write operation directed to the second valid memory block is completed prior to a write operation of the first valid memory block, and
a write operation directed to the first valid memory block is a last write operation of the plurality of valid memory blocks.

6. The system of claim 1, wherein the controller is further configured to:
successfully perform a plurality of read operations on a set of the plurality of valid memory blocks that are not lost.

7. The system of claim 6, wherein the controller is configured to:
in response to the first valid memory block being lost, restoring data associated with the first valid memory block by executing an XOR operation on check code data associated with the check code factor.

8. The system of claim 7, wherein the XOR operation is executed on the check code data associated with the check code factor after the plurality of read operations are successfully performed on the set of the plurality of valid memory blocks that are not lost.

9. The system of claim 6, wherein the controller is further configured to,
generate check code data in the check code factor by performing an XOR operation on memory data of each of the plurality of valid memory blocks; and
in response to memory data of one valid memory blocks of the plurality of valid memory blocks being lost, accessing memory data stored in a rest of the plurality of valid memory blocks using the address chain, and restoring lost memory data by performing an XOR operation on the check code data and accessed memory data.

10. The system of claim 1, wherein:
the memory device further comprises an invalid memory block of which a write operation is unsuccessful, and
the address chain skips address pointers pointing to the invalid memory block.

11. The system of claim 1, wherein the memory device comprises a three-dimensional (3D) memory device.

12. A method for operating a memory apparatus using redundant array of independent disks (RAID) comprising:
generating, by a memory controller, an address chain as part of a check code factor of a plurality of valid memory blocks stored with memory data, the plurality of valid memory blocks comprising a first valid memory block and a second valid memory block, and the address chain comprising a first address pointer pointing to the first valid memory block and another address pointer pointing to the second valid memory block;
generating, by the memory controller, a second address pointer for storage in the first valid memory block, the second address pointer pointing to the second valid memory block;
in response to the first valid memory block not being lost, using, by the memory controller, the first address pointer in the address chain to read the first valid memory block, and using, by the memory controller, the second address pointer in the first valid memory block to read the second valid memory block; and
in response to the first valid memory block being lost, using, by the memory controller, the another address pointer in the address chain to read the second valid memory block.

13. The method of claim 12, wherein:
the plurality of valid memory blocks further comprises a third valid memory block, and
the method further comprises:
generating, by the memory controller, another first address pointer as part of the address chain in the check code factor, the another first address pointer pointing to the second valid memory block; and
generating by the memory controller, another second address pointer for storage in the first valid memory block, the another second address pointer pointing to the third valid memory block.

14. The method of claim 13, further comprising:
performing, by the memory controller, a write operation on the third valid memory block prior to performing a write operation on the first valid memory block.

15. The method of claim 12, further comprising:
generating, by the memory controller, a respective second address pointer and a respective other second address pointer in the second valid memory block, the respective second address pointer and the respective other second address pointer each pointing to a different valid memory block of which a writing operation is completed prior to that of the second valid memory block.

16. The method of claim 12, further comprising:
performing, by the memory controller, a write operation directed to the second valid memory block prior to performing a write operation on the first valid memory block, and
wherein a write operation directed to the first valid memory block is a last write operation of the plurality of valid memory blocks.

17. The method of claim 12, further comprising:
in response to the first valid memory block being lost, restoring, by the memory controller, data associated with the first valid memory block by executing an XOR operation on check code data associated with the check code factor.

18. A memory controller, comprising:
a processor and a memory, wherein the processor and the memory are operatively coupled to a plurality of valid memory blocks stored with memory data, wherein the plurality of valid memory blocks comprise a first valid memory block and a second valid memory block, and wherein the processor, in an operation on redundant array of independent disks (RAID), is configured to:
generate an address chain as part of a check code factor of the plurality of valid memory blocks, the address chain comprising a first address pointer pointing to the first valid memory block and another address pointer pointing to the second valid memory block;
generate, for storage in the first valid memory block, a second address pointer, the second address pointer pointing to the second valid memory block;
in response to the first valid memory block not being lost, use the first address pointer in the address chain to read the first valid memory block, and use the second address pointer in the first valid memory block to read the second valid memory block; and
in response to the first valid memory block being lost, use the another address pointer in the address chain to read the second valid memory block.

* * * * *